United States Patent
Morrison et al.

(10) Patent No.: US 12,161,066 B2
(45) Date of Patent: Dec. 10, 2024

(54) HILLSIDE CHAFFER

(71) Applicant: AGCO International GmbH, Neuhausen (CH)

(72) Inventors: Alastair Cameron Morrison, Breganze (IT); Morten Leth Bilde, Langaa (DK); Andrew White, Kennilworth (GB)

(73) Assignee: AGCO International GmbH, Neuhasen (CH)

( * ) Notice: Subject to any disclaimer, the term of this patent is extended or adjusted under 35 U.S.C. 154(b) by 665 days.

(21) Appl. No.: 17/446,131

(22) Filed: Aug. 26, 2021

(65) Prior Publication Data
US 2022/0071098 A1    Mar. 10, 2022

(30) Foreign Application Priority Data

Sep. 4, 2020 (GB) ..................................... 2013920

(51) Int. Cl.
*A01F 12/44* (2006.01)

(52) U.S. Cl.
CPC .......... *A01F 12/446* (2013.01); *A01F 12/444* (2013.01)

(58) Field of Classification Search
CPC .............. A01D 41/127; A01D 41/1272; A01D 41/1273; A01D 41/1276; A01D 75/282; A01F 12/44; A01F 12/46; A01F 12/444; A01F 12/446; A01F 12/30; A01F 7/00; B07B 1/46; B07B 4/08
See application file for complete search history.

(56) References Cited

U.S. PATENT DOCUMENTS

| | | | |
|---|---|---|---|
| 4,561,972 A | 12/1985 | Alm | |
| 5,338,257 A * | 8/1994 | Underwood | A01D 75/282 460/95 |
| 5,588,912 A * | 12/1996 | Schumacher, II | B07B 13/18 460/101 |
| 5,791,986 A | 8/1998 | Underwood et al. | |
| 6,056,639 A * | 5/2000 | Gryspeerdt | A01F 12/44 460/145 |
| 7,877,969 B2 | 2/2011 | Behnke | |

(Continued)

FOREIGN PATENT DOCUMENTS

| | | |
|---|---|---|
| EP | 0898875 A1 | 3/1999 |
| EP | 2156727 A2 | 2/2010 |
| GB | 2009040.3 | 6/2020 |

OTHER PUBLICATIONS

UK Intellectual Property Office, Search Report for related UK Application No. GB2013920.0, dated Feb. 22, 2021.

Primary Examiner — Thomas B Will
Assistant Examiner — Robert E Pezzuto

(57) ABSTRACT

A cleaning mechanism of a combine harvester, for cleaning threshed and separated crop material, including a grain pan for receiving threshed and separated crop material and transporting the crop material rearwardly; a chaffer installed proximate the grain pan for receiving material from the grain pan where the chaffer includes a plurality of longitudinal channels with non-planar surfaces giving each channel a curved or trapezoidal cross section and at least two of the chaffer channels have an asymmetric non-planar surface with a greater part of the surface area facing the side portions of the chaffer; and a fan that causes an air flow through the chaffer to lift up discardable parts from the crop material and transport the discardable parts out of the combine harvester.

9 Claims, 4 Drawing Sheets

(56) References Cited

U.S. PATENT DOCUMENTS

| | | |
|---|---|---|
| 9,345,197 B2 | 5/2016 | Biggerstaff et al. |
| 9,629,310 B2 | 4/2017 | Bilde |
| 2014/0128133 A1 | 5/2014 | Claerhout |
| 2017/0325408 A1 | 11/2017 | Bilde |
| 2017/0332554 A1* | 11/2017 | Bilde ................... A01F 12/46 |

* cited by examiner

HILLSIDE CHAFFER

FIELD OF INVENTION

The present invention relates to agricultural harvesters such as combines, and, more particularly, to chaffers being part of the grain cleaning mechanism of such harvesters.

BACKGROUND OF INVENTION

Self-propelled combine harvesters have been used by farmers since the early twentieth century to harvest grain crops from fields. Since then the basic architecture of the crop processing system employed has not changed significantly and is well known.

The process for cleaning grain in combine harvesters has not changed fundamentally for many decades. The cleaning unit, or 'shoe', has directed therethrough a cleaning airstream which is typically generated by a cross-flow or centrifugal fan located in front of the cleaning shoe. As a mix of grain kernels, chaff, tailings and straw is passed over one or more oscillating sieves, the cleaning airstream serves to blow the lighter materially in a generally rearward direction over the sieves and out of the rear of the machine. The grain is generally heavier and/or smaller than the material other than grain (MOG) in the mix and passes through the sieves.

The cleaning shoe is most efficient when the grain is caused to settle on the uppermost sieve (hereinafter referred to as the chaffer) as early as possible and the lighter material is kept airborne. If the grain bounces on impact with the chaffer then the risk of the cleaning airstream carrying the grain out of the rear of the shoe increases. The speed of the cleaning airstream is typically selected to strike a balance between grain cleanliness and acceptable loss. Ultimately, this balance creates a limit on the capacity of the cleaning unit.

Furthermore, sieves and chaffers operate more efficiently if the grain is evenly distributed across their width and not concentrated within a narrow area. As the combine travels across a hillside, such hillside conditions can cause the crop material on the sieve or chaffer to migrate to one side or the other which can compromise the functioning of the sieves and chaffers. To compensate for this problem, many combines employ active levelling devices to negate the effects of hillside conditions which are typically complicated and expensive solutions.

SUMMARY OF INVENTION

It is an object of the invention to provide an improved chaffer for use in a combine harvester which provides a better distribution of crop material to the lower sieve during performance of the combine on side hill conditions.

According to a first aspect of the present invention, there is provided a cleaning mechanism for a combine harvester for cleaning threshed and separated crop material, the cleaning mechanism comprising:
- a grain pan for receiving the threshed and separated crop material and transporting the crop material rearwardly;
- a chaffer installed proximate said grain pan for receiving the material from said grain pan, wherein the chaffer is a longitudinal body having front and rear ends and side portions aligned with the forward and aft directions of travel of the combine harvester, the chaffer comprising a plurality of longitudinal channels extending along the length thereof; and
- a fan operable to cause an air flow through said chaffer for lifting up discardable part from the crop material and transporting it out of the combine harvester;
- wherein at least two of the chaffer channels have an asymmetric non-planar surface with a greater part of the surface area disposed towards the side portions of the chaffer.

The invention involves the recognition that in hillside conditions for a conventional machine, the grain 'bounces' down the side of the longitudinal channels of the chaffer. By providing channels which have not only a non-planar surface but also an asymmetric cross-section to provide an increased operating surface area for at least the outer channels (which concentrates the grain towards the center of the channel) despite the machine travelling on a hillside, the performance may be increased. The crop material will remain in contact with the surface of the channel despite the lateral tilt.

Preferably, the channels extend along the whole length of the chaffer, and the outer channels with asymmetric profile may be provided on either side of one, two or more inner channels having respective symmetrical or asymmetrical cross-sections.

The non-planar surface refers to the active surface upon which grain settles on the chaffer.

The non-planar surface may have a curved profile in cross-section and may be part-(or partially-) elliptical or parabolic.

Alternatively, the non-planar surface may be comprised of a plurality of abutting angularly offset planar surfaces, and may include inwardly declined sidewalls wherein the cross-sectional area within said declined sidewalls is trapezoidal in shape. The inwardly declined side walls suitably meet a straight base wall.

The invention lends itself to a combine harvester employing virtually any known type of threshing and separating apparatus. For example, the threshing and separating apparatus may be of the conventional type, a single or twin-axial type, or a hybrid system.

BRIEF DESCRIPTION OF THE DRAWINGS

The invention will now be described, by way of example only, with reference to the accompanying drawings, in which.

SPECIFIC DESCRIPTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
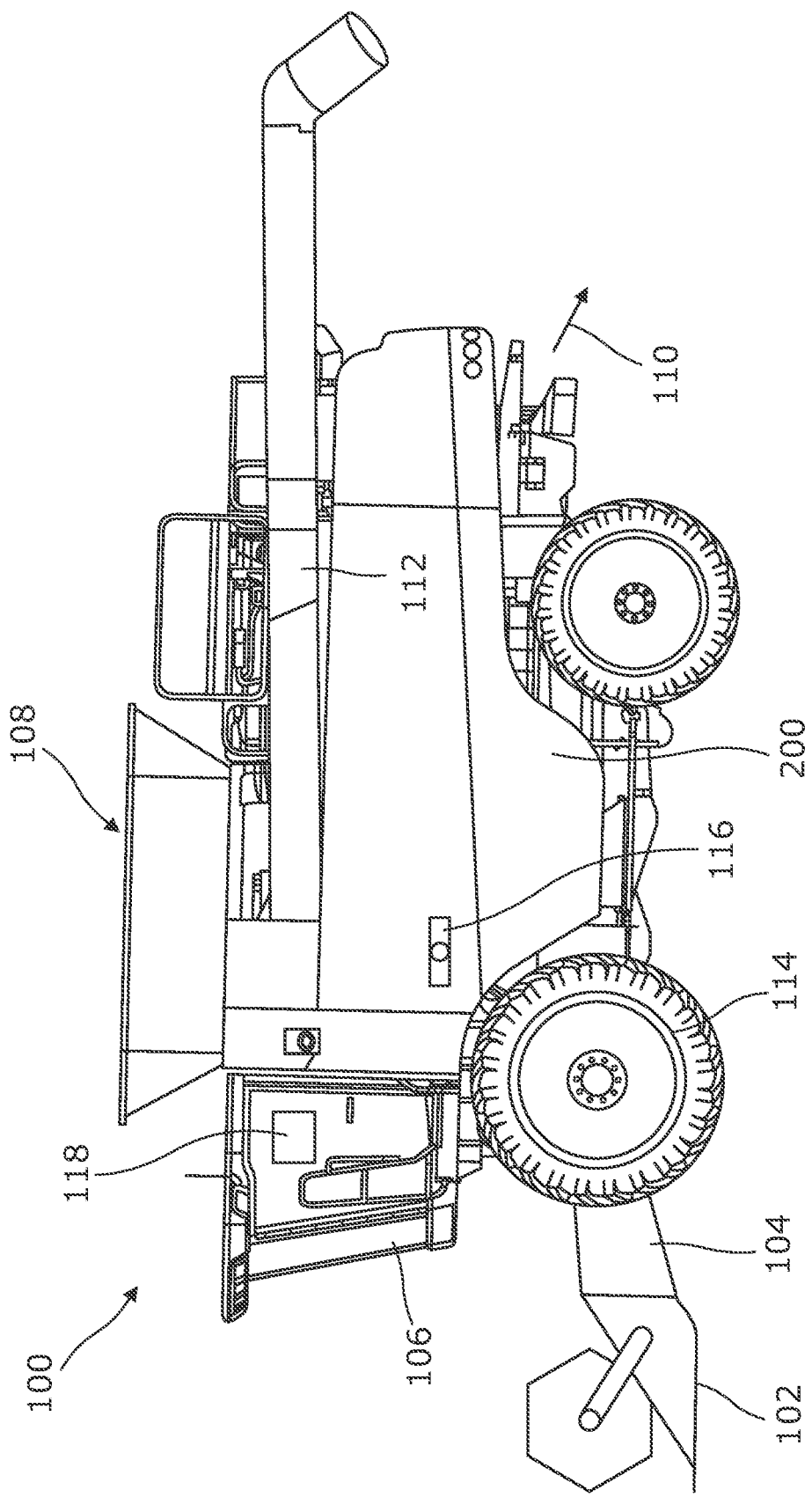
FIG. 1 shows a schematic side view of a known combine harvester comprising a known crop processing architecture.

With reference to FIG. 1, a self-propelled combine harvester 100 carries a header 102 that cuts and gathers a strip of crop as the combine harvester 100 is driven across a crop field. An elevator section 104 conveys the cut crop stream from the header 102 into a crop processing apparatus 200 in the combine harvester 100, described in more detail below. Clean grain separated from the crop stream is collected in a storage tank 108, which is periodically emptied into a trailer or other vehicle or storage container via an unloading auger 112. Residue material (also known as discardable material or MOG (material other than grain)) remaining from the crop stream, such as straw and chaff, is ejected from the rear of the combine harvester 100, represented by arrow 110. The combine harvester 100 also typically includes an operator cab 106, an engine, and wheels 114 and/or tracks. In some embodiments, the combine harvester 100 may include a sensor 116 configured to measure the orientation of the combine harvester 100 with respect to gravity (i.e., to determine whether the combine harvester 100 is on a slope). The sensor 116 may be electrically connected to a controller 118, typically located in the operator cab 106, or at least having a user control interface thereto within the cab.

The controller 118 is typically a programmable unit coupled to operate various features of the combine harvester 100, such as engine control (ECU) functions, harvester header and processing unit functions.

References herein to directions such as forward, reverse, left, right are taken from the perspective of an operator sitting in the cab 106, wherein "forward" represents the driving direction of the harvester as it cuts the crop material.

Figure 2:
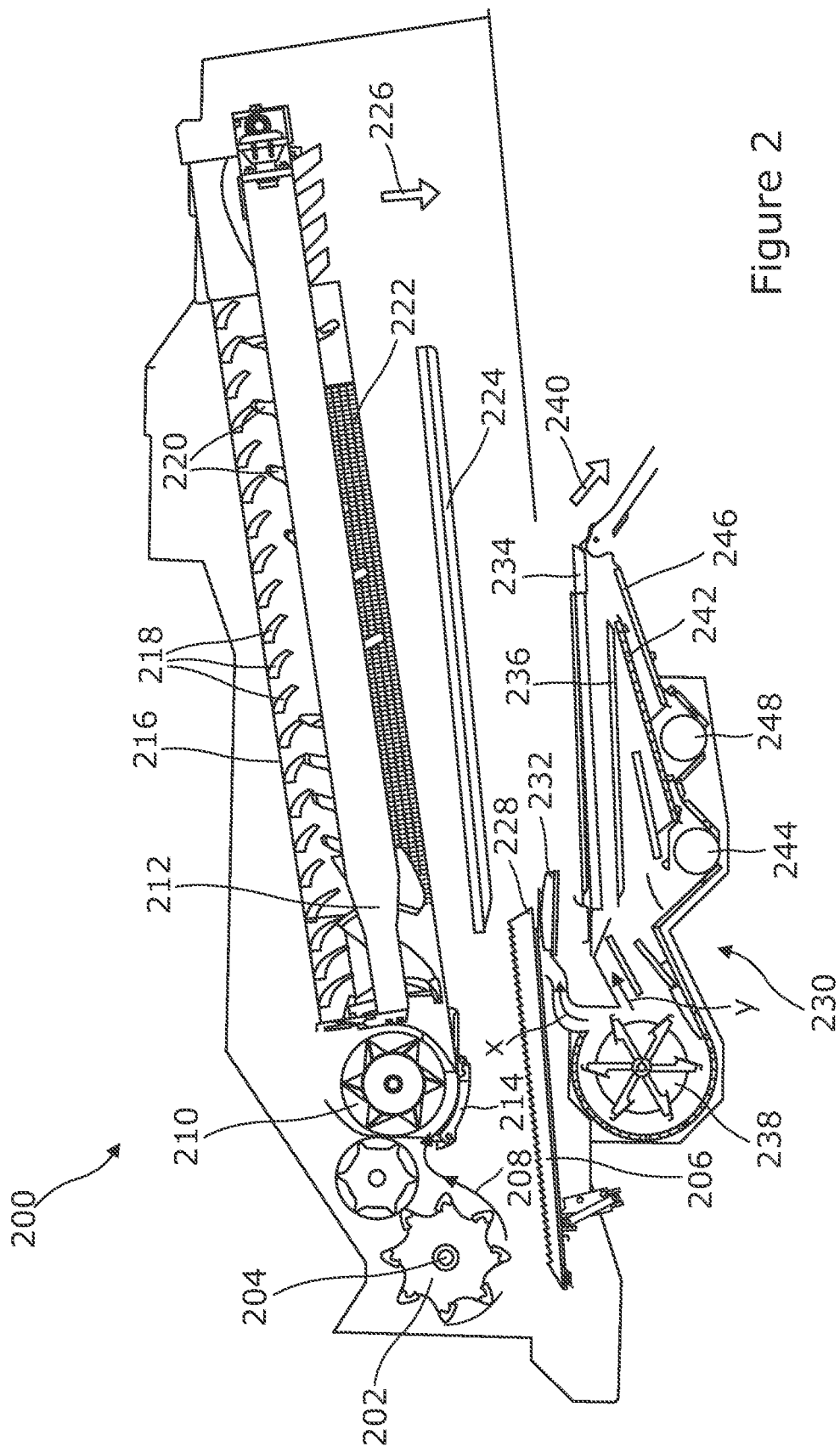
FIG. 2 shows a simplified side view of a crop processing apparatus that may be used in the combine harvester of FIG. 1.

Turning to the details of the crop processing apparatus 200, as shown in FIG. 2, the crop stream passes from the elevator section 104 (FIG. 1) into a threshing unit having a transverse threshing cylinder 202 that rotates around a transverse axis 204. As in known combines, the crop stream is threshed between the threshing cylinder 202 and a concaved surface (not shown). Grain and chaff separated in this process falls through a grate in the concaved surface onto an underlying thresher pan 206, forming a primary grain/chaff stream. The residue straw is conveyed rearwardly as represented by arrow 208 from the threshing unit to a transverse transfer beater 210. From here, the crop stream is typically divided into two sub-streams and passed into respective longitudinally-aligned separating rotors 212. It will be appreciated that only one separating rotor 212 is shown in FIG. 2, with the other separating rotor 212 being hidden from view. The transfer beater 210 has associated therewith a concave grate 214 through which further grain and chaff may fall under gravity onto the underlying thresher pan 206.

Each separating rotor 212 has associated therewith a substantially cylindrical cage 216 within which the separating rotor 212 rotates. Upon the inside upper peripheral surface of each rotor cage 216, a plurality of guide vanes 218 are mounted for cooperation with fingers 220 of the separating rotor 212, which together further separate grain from straw. The lower portion of each rotor cage 216 has a grate 222 formed therein, which allows separated grain and chaff to fall by gravity onto an underlying separator pan 224, forming a secondary grain/chaff stream.

The residue straw is ejected from the crop processing apparatus 200 at the rear of the respective separating rotors 212, as indicated by arrow 226.

Although the above described crop processing apparatus 200 includes a threshing cylinder 202 and transverse transfer beater 210 followed by a pair of longitudinal separating rotor 212(s) operating on an axial separation principle (which may be referred to in the art as a "hybrid" processing system), different processing apparatus may be used in some embodiments. For example, the separating rotors 212 may be replaced with straw walkers, as described in U.S. Pat. No. 7,877,969. In other embodiments, the threshing cylinder 202 and transverse transfer beater 210 may be replaced by a feed cylinder, and threshing may be caused by the rotors 212, as described in U.S. Pat. No. 9,629,310. In still other embodiments, the crop processing apparatus 200 may include one or more transverse rotors, as described in U.S. Pat. No. 9,345,197.

Both the thresher pan 206 and separator pan 224 are driven in an oscillating manner to convey grain and chaff streams rearwardly and forwardly respectively. The drive mechanism for the thresher pan 206 and separator pan 224 is conventional and is not described in detail herein.

In some embodiments, a stream of grain and chaff is transferred from a rear edge 228 of the thresher pan 206 to a cleaning shoe 230. The grain and chaff may initially fall onto a cascade pan 232 before falling onto a chaffer 234 in the cleaning shoe 230. In other embodiments, various mechanisms may be used to convey the stream of grain and chaff to the cleaning shoe chaffer 234, which mechanisms are generally known in the art and not described in detail herein.

One or more blowers 238 generate a cleaning airstream, a portion of which is directed rearwardly between the thresher pan 206 and cascade pan 232 as represented by arrow X. The lighter chaff may be blown rearwardly and carried by the airstream out of the rear of the crop processing apparatus 200 as represented by arrow 240, while the heavier grain falls onto the cascade pan 232, and then onto the chaffer 234. Another airstream, represented by arrow Y, is directed rearwardly between the chaffer 234 and a sieve 236. The airstream(s) from the blower(s) 238 may be directed along any selected path. For example, the blower(s) may provide a single airstream to the chaffer 234. Again, the cascading motion of the grain and chaff allows the airstream Y to convey additional chaff toward the rear of the cleaning shoe 230. The chaffer 234 is coarser (having larger openings) than the sieve 236, which is located under the chaffer 234. The chaffer 234 and sieve 236 may also be referred to in the art as an upper sieve and lower sieve, respectively, because they may be of generally the same construction.

The chaffer 234 and the sieve 236 are generally driven forward and rearward in an oscillating manner. Straw and material too large to pass through chaffer 234 is conveyed rearwardly by the oscillating motion before falling from the rear edge and out of the rear of the crop processing apparatus 200, as indicated by arrow 240. Tailings, or unthreshed grain, and grain passes through the chaffer 234 onto the sieve 236. Grain falls through sieve 236 onto an underlying collection pan 242, which directs the clean grain to a transverse delivery auger 244 for delivering the grain to the storage tank 108 (FIG. 1). The tailings that cannot pass through the holes in the sieve 236 are conveyed rearwardly by the oscillating motion before falling from the rear edge of the sieve 236 onto a tailings collection pan 246, which delivers the tailings to a rethreshing delivery system 248, which may include, for example, an auger, a blower, and/or a conveyor.

The chaffer 234 (or upper sieve) comprises adjustable louvres 254 (FIG. 3) supported on a chaffer frame which is driven in a fore-and-aft oscillating manner. The material which settles on the chaffer 234 is conveyed in a generally rearward direction and the heavier smaller grain-rich material passes between the louvres onto the underlying lower sieve 236, whereas the lighter larger material passes to the end of the chaffer and out of the rear of the machine.

Figure 3:
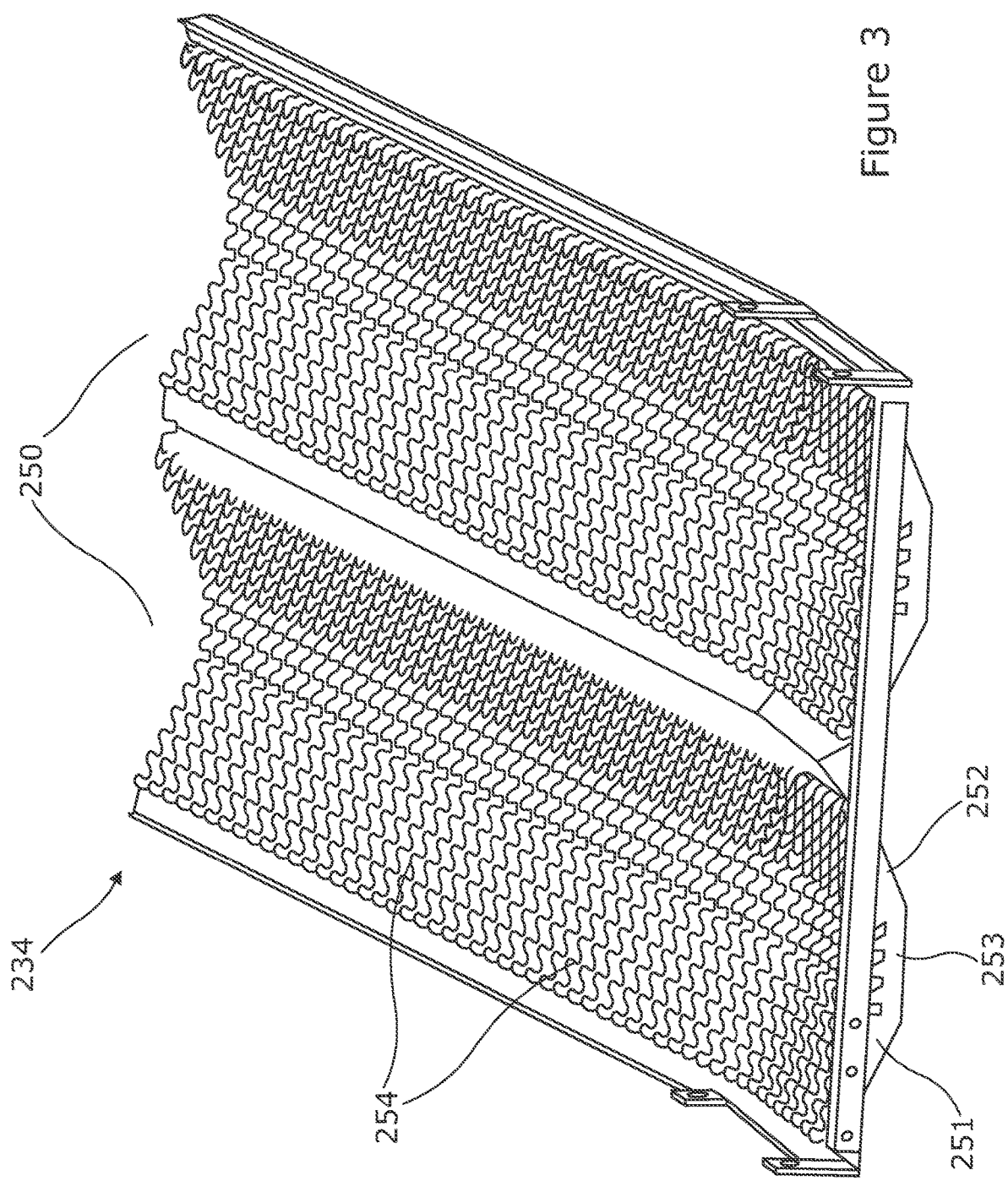
FIG. 3 shows a perspective view of a chaffer, having a non-linear cross-sectional profile, suitable for use in the crop processing apparatus of FIG. 2.

For the purposes of illustration, FIG. 3 shows a perspective view of part of the chaffer 234 comprising two symmetrically cross-sectioned channels 250 each having a non-planar surface formed by a plurality of abutting planar surfaces, including inwardly declined sidewalls 251, 252 meeting a straight base wall 253 wherein the area within said declined sidewalls is trapezoidal in shape. Further details of this symmetrical construction are described in the applicants United Kingdom patent application GB2009040.3 filed 15 Jun. 2020, the contents of which are incorporated herein by reference.

Dividers, in the form of longitudinally extending upstanding walls between the chaffer channels 250, may be provided to reduce lateral spillage between channels when the combine is travelling across a slope (i.e. with the left hand side of the combine positioned higher that the right hand side, or vice versa).

In sidehill conditions, the grain can accumulate towards the one side of the bottom surface of the channels (piled up against a divider) of a conventional planar chaffer according to the slope of the hillside. This results in less effective cleaning of the grain as it passes through the chaffer to the lower sieve.

However, as described in the above-referenced GB2009040.3, having a non-planar surface as the bottom surface of the channel of the chaffer helps to concentrate the grain more towards the center of the non-planar surface away from the dividers leading to more effective cleaning of the grain before it reaches the lower sieve. In addition, the non-planar surface of the chaffer provides an increased surface area across each channel 250 for the separation of the grain.

In an enhancement to the arrangement of GB2009040.3, the present invention provides an asymmetrical cross-sectional profile for at least some of the chaffer channels to provide an increased amount of bottom surface area to one side of the channel or the other, towards the outer edge of the chaffer assembly, to improve sidehill performance.

By providing outer channels 250 which have an asymmetric and non-planar surface, during sidehill operation, more of the grain is spread across an operational (bottom) surface of the channel on the downhill side of the chaffer assembly, where it would otherwise pile up against a sidewall or divider of the chaffer due to gravity. More of the crop material therefore remains in contact with the operational part of the channel (i.e. not sidewalls or dividers) and as a result, remains better distributed horizontally which, in turn, leads to more efficient distribution of crop material to the lower sieve 236.

FIGS. 4A-E illustrate a number of alternative cross-sectional configurations of chaffer in a cleaning mechanism embodying the present invention.

Figure 4A:
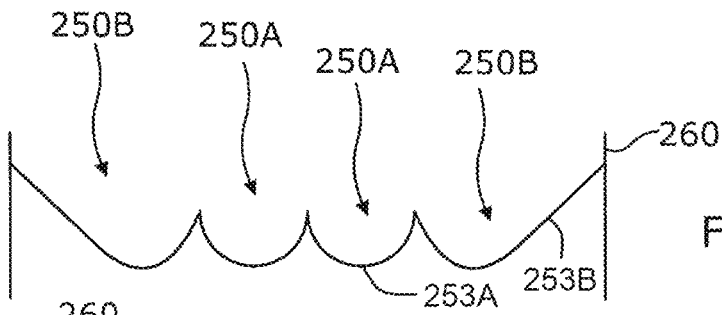
FIGS. 4A, B, C, D and E schematically represent different possible arrangements of asymmetrical chaffer cross-sections in a cleaning mechanism in accordance with the present invention.

In FIG. 4A, the chaffer comprises four channels 250A, B between upstanding side frame portions 260 of the chaffer assembly. The two inner channels 250A each have a generally symmetrical cross-section and may comprise a flat base (not shown) or a non-planar base 253A, which may have a semi-circular, arcuate, elliptical, parabolic or otherwise curved profile. The two outer channels 250B comprise asymmetric (but mirrored) profiles 253B which may be parabolic or elliptical or otherwise curved in profile, but each of which is configured to have the greater proportion of its surface area disposed towards the adjacent frame portion 260. Upstanding dividers (not shown) may be provided between adjacent chaffer channels 250A, B.

Figure 4B:
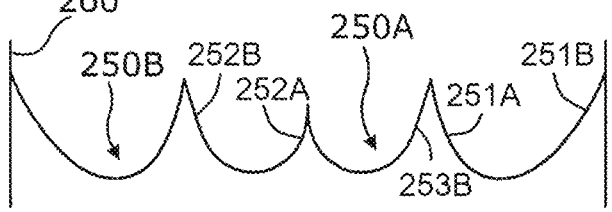

The arrangement of FIG. 4B is similar to that of FIG. 4A, save it that the two inner channels 250A comprise asymmetric (but mirrored) profiles 253B which may be parabolic or elliptical or otherwise curved in profile, but each of which is configured to have the greater proportion of its surface area disposed towards the outer edge of the chaffer assembly. In FIG. 4C, the chaffer again comprises four channels 250A, B between upstanding side frame portions 260 of the chaffer assembly. The two inner channels 250A each have a generally symmetrical cross-section and, as in FIG. 3 and GB2009040.3, are formed of a plurality of abutting angularly offset planar surfaces in the form of a base wall 253A and inwardly declined sidewalls 251A, 252A. For the two outer channels 250B, the sidewalls 251B of the two channels adjacent the sidewalls 260 of the assembly have substantially the same area, which area is greater than the sidewalls 252B of those same channels adjacent the two inner channels. This reproduces the arrangement of two asymmetric outer channels, as in FIG. 4A. Upstanding dividers 262 are provided between adjacent chaffer channels 250A, B.

Figure 4C:
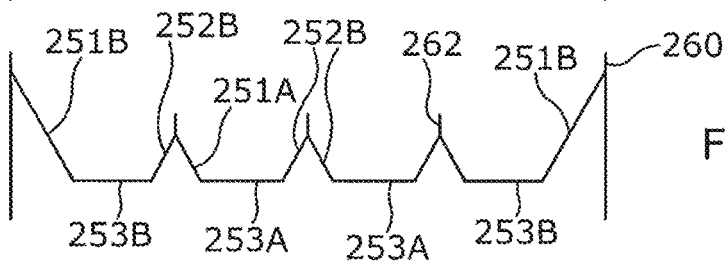
Figure 4D:
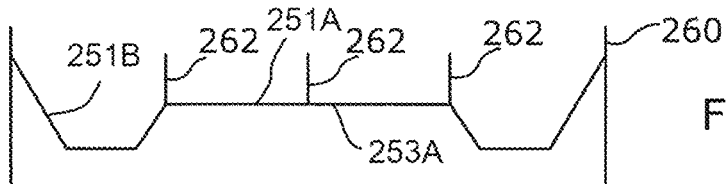

In FIG. 4D, the configuration of the two outer channels 251B is as for FIG. 4C. The two inner channels 250A have a flat (planar) cross section—i.e. base wall 253 A only, and no sidewalls 251, 252—and with upstanding dividers 262 provided between adjacent chaffer channels 250A, B.

Figure 4E:
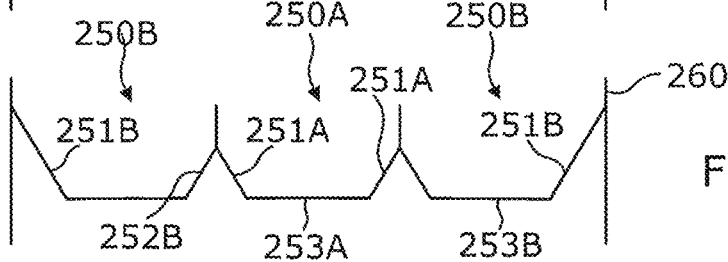

In FIG. 4E, the configuration is similar to that of FIG. 4C, but with only three channels provided as the pair of asymmetric outer channels 250B and a single symmetrical inner channel 250A.

As will be understood, assemblies having other numbers of channels, and mixtures of asymmetric and symmetric (curved or planar) channels, may be provided as long as at least two of the chaffer channels have an asymmetric non-planar surface with a greater part of the surface area disposed towards the side portions of the chaffer.

In the foregoing, the applicants have described a cleaning mechanism for a combine harvester, for cleaning threshed and separated crop material, which includes a grain pan for receiving the threshed and separated crop material and transporting the crop material rearwardly. A chaffer 234 installed proximate the grain pan receives the material from the grain pan: the chaffer comprises a plurality of longitudinal channels 250 having a non-planar surface giving each channel a curved or trapezoidal cross section, wherein at least two of the chaffer channels have an asymmetric non-planar surface with a greater part of the surface area disposed towards the side portions of the chaffer. A fan causes an air flow through the chaffer 234 for lifting up discardable part from the crop material and transporting it out of the combine harvester. A combine harvester including the cleaning mechanism is also provided.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure.

The invention claimed is:

1. A cleaning mechanism for a combine harvester for cleaning threshed and separated crop material, the cleaning mechanism comprising:

a grain pan for receiving the threshed and separated crop material and transporting the crop material rearwardly;

a chaffer installed proximate the grain pan for receiving the crop material from the grain pan, wherein the chaffer is a longitudinal body having a front end, a rear end and a pair of side portions aligned with forward and aft directions of travel of the combine harvester, the chaffer comprising a plurality of longitudinal channels extending along a chaffer length between the pair of side portions; and a fan operable to cause an air flow through the chaffer for lifting up discardable parts of the crop material and transporting the discardable parts out of the combine harvester;

wherein at least two of the chaffer channels have an asymmetric non-planar surface, with one of the at least two chaffer channels positioned closer to one of the pair of side portions and the other of the at least two chaffer channels positioned closer to the other of the pair of side portions, each of the at least two chaffer channels comprising an inner sidewall and an outer sidewall and a base extending from the front end to the rear end with both the inner and outer sidewalls declining towards the base, with the outer sidewall positioned closer to the respective side portion than the inner sidewall, and the asymmetric non-planar surface shaped such that the outer sidewall inclines toward the side portion to provide the chaffer channel with a greater part of the surface disposed towards the side portion of the chaffer.

2. The cleaning mechanism of claim 1, wherein the asymmetric non-planar surfaces are curved.

3. The cleaning mechanism of claim 2, wherein the non-planar surfaces are part-parabolic.

4. The cleaning mechanism of claim 2, wherein each of the non-planar surfaces are part-elliptical.

5. The cleaning mechanism of claim 1, wherein each of the non-planar surfaces is comprised of a plurality of abutting angularly offset planar surfaces.

6. The cleaning mechanism of claim 5, wherein each of the non-planar surfaces includes inwardly declined sidewalls wherein the cross-sectional area within the declined sidewalls is trapezoidal in shape.

7. The cleaning mechanism of claim 1, wherein the chaffer comprises at least three parallel and adjacent longitudinal channels.

8. A combine harvester comprising the cleaning mechanism of claim 1.

9. The combine harvester of claim 8, further comprising a threshing and separating mechanism for threshing and separating crop material.

\* \* \* \* \*